(12) United States Patent
Köck

(10) Patent No.: US 8,137,080 B2
(45) Date of Patent: Mar. 20, 2012

(54) COMPRESSOR ASSEMBLY COMPRISING A VALVE UNIT IN THE INTAKE REGION

(75) Inventor: Engelbert Köck, Planegg (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 734 days.

(21) Appl. No.: 12/295,839

(22) PCT Filed: Apr. 5, 2007

(86) PCT No.: PCT/EP2007/003095
§ 371 (c)(1),
(2), (4) Date: Jan. 2, 2009

(87) PCT Pub. No.: WO2007/115789
PCT Pub. Date: Oct. 18, 2007

(65) Prior Publication Data
US 2009/0252627 A1    Oct. 8, 2009

(30) Foreign Application Priority Data
Apr. 6, 2006    (DE) .......................... 10 2006 016 317

(51) Int. Cl.
F04B 17/00    (2006.01)
F04B 35/04    (2006.01)
(52) U.S. Cl. ................ 417/410.4; 418/201.1; 418/201.2
(58) Field of Classification Search ................... 417/307, 417/311, 375
See application file for complete search history.

(56) References Cited

U.S. PATENT DOCUMENTS

| 2,247,520 A | 7/1941 | Paxton |
| 5,010,916 A | 4/1991 | Albrecht |
| 7,140,846 B2 | 11/2006 | Yamamoto et al. |
| 2005/0084404 A1 | 4/2005 | Okada et al. |
| 2006/0021661 A1 | 2/2006 | Koch et al. |

FOREIGN PATENT DOCUMENTS

| DE | 1 550 256 | 7/1969 |
| DE | 19716549 C2 | 11/1998 |

(Continued)

OTHER PUBLICATIONS

Chinese Office Action Dated Feb. 24, 2010.

(Continued)

*Primary Examiner* — Toan Ton
*Assistant Examiner* — Kevin Quarterman
(74) *Attorney, Agent, or Firm* — Barnes & Thornburg LLP

(57) ABSTRACT

An air compressor assembly includes a compressor housing, an intake port defined by the compressor housing for intake of the air, and a plurality of guide contours disposed adjacent to the intake port. The guide contours include between three and six strips. A valve unit is disposed adjacent to the intake port, the valve unit comprising a closing element that assumes an opened position during operation and a closed position when in a switched-off state. The closing element is plate-shaped, is axially movable, and is guided by the plurality of guide contours between the opened position and the closed position. A stroke limitation element is provided to limit axial movement of the closing element in the opened position. A spring is disposed between the closing element and the stroke limitation element. The spring provides a return force to the closing element to bias the closing element into the closed position.

15 Claims, 2 Drawing Sheets

FOREIGN PATENT DOCUMENTS

| | | |
|---|---|---|
| DE | 10 2004 033 022 A1 | 2/2006 |
| EP | 0855519 A2 | 7/1998 |
| EP | 1 347 176 A2 | 9/2003 |
| GB | 1 003 295 A | 9/1965 |
| JP | 9-133088 | 5/1997 |
| JP | 09-133088 H | 5/1997 |
| JP | 09133088 A * | 5/1997 |
| WO | WO 2006/096178 A | 9/2006 |
| WO | WO 2006/096179 A | 9/2006 |

OTHER PUBLICATIONS

English translation of Chinese Office Action Dated Feb. 24, 2010.
English Translation of the International Preliminary Examination Report for PCT Patent Application PCT/EP2007/0030956, dated Dec. 4, 2008.

* cited by examiner

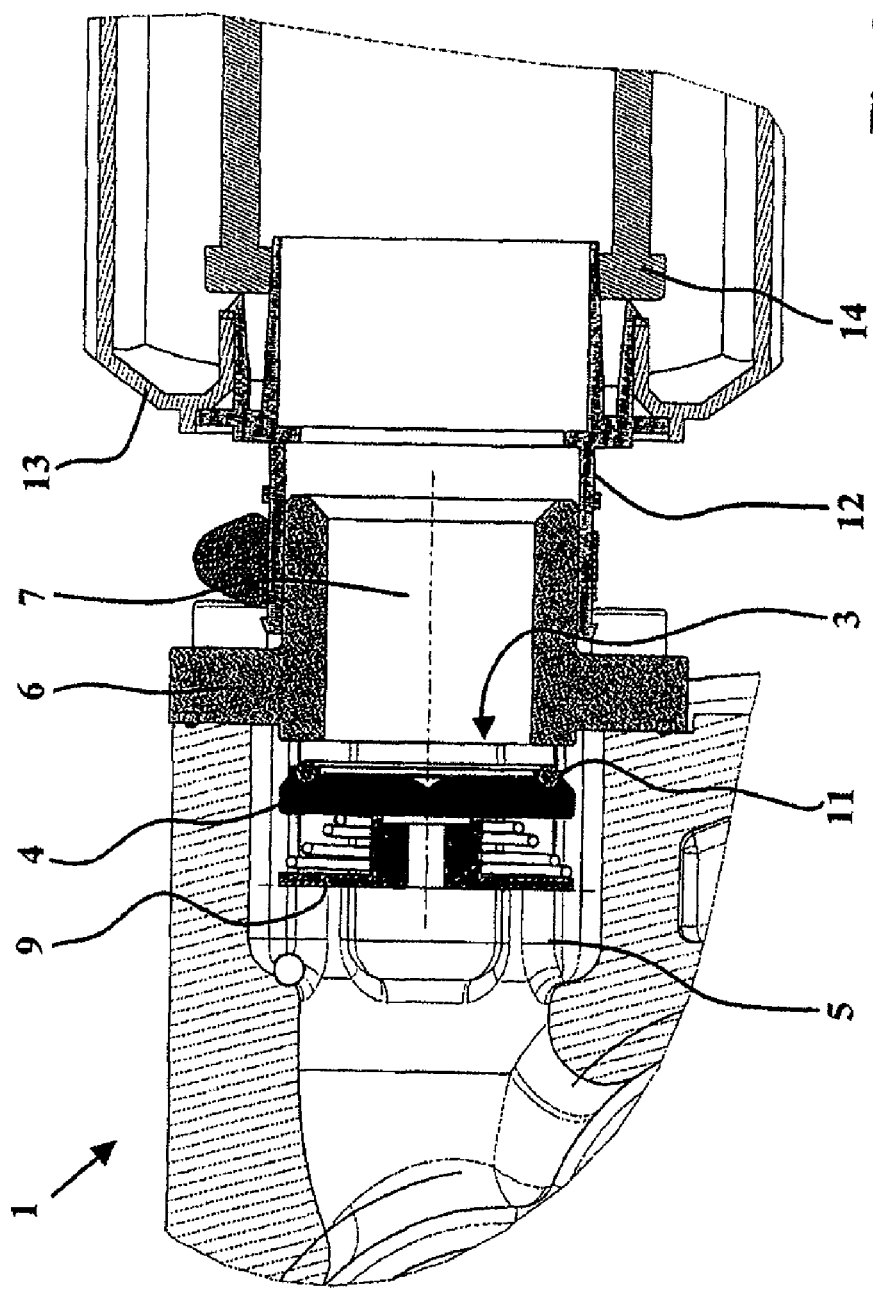

COMPRESSOR ASSEMBLY COMPRISING A VALVE UNIT IN THE INTAKE REGION

CROSS-REFERENCE TO RELATED APPLICATIONS

This application is a National Phase Application based upon and claiming the benefit of priority to International Application No. PCT/EP2007/003095, filed on Apr. 5, 2007, and to German Application No. 10 2006 016 317.6, filed on Apr. 6, 2006, the contents of both of which are incorporated herein by reference.

FIELD OF THE INVENTION

The present invention relates to a compressor assembly, in particular a screw compressor for compressed air generation, comprising a compressor housing having an intake port through which the compressor assembly sucks in the pressure medium, a valve unit being provided which comprises a closing element, the closing element assuming an open position during the operation of the compressor assembly and a closing position in the switched-off state.

DESCRIPTION OF RELATED ART

Compressor assemblies of the type relevant here are, in particular, screw compressors which are used for compressed air generation. A preferred field of use of screw compressors of this type is compressed air generation in rail vehicles and special vehicles, such as, for example, articulated buses, in order to ensure continuous supply of various consumers which are operated by means of compressed air. Screw compressors are in this case distinguished by high reliability, a high achievable pressure level and a continuous flow of the pressure medium. The screw compressors are in this case integrated in various installation positions into the corresponding construction space in the rail vehicle. When the screw compressor is in operation, it sucks in through the intake port the air to be compressed which is subsequently compressed by means of the screw rotors. When the screw compressor is switched off, however, the compressed air surges out of the compressor housing back into the intake port. As a result, a valve unit usually prevents a rearward escape of the compressed air from the outlet port by closing the latter during the switch-off. Only when operation commences once again does the valve unit open, so that the compressed air can re-enter the compressor housing in the inflow direction. The valve unit functions as a nonreturn valve.

Valve units are generally known for this purpose which comprise a flap, which is actuated by counterweight under the action of gravity. The installation position of the compressor assembly is therefore essential for the functioning of the valve unit. The assembly in this case requires a correspondingly large overall height, since it often has to be installed vertically. Intake controllers are frequently used, which, although being capable of being installed in a horizontal arrangement and include the function of an intake nonreturn valve, nevertheless often have a specific housing, a valve disk, which changes between the closing position and the open position, being guided in a stem within a cylindrical extension. Systems of this type frequently require a specific housing and are therefore highly space-intensive in terms of the installation space which they require.

DE 197 16 549 C2 discloses a generic screw compressor which comprises a valve unit which is designed as a nonreturn valve and which is arranged in the air inlet connection piece. The nonreturn valve possesses a flap which is pressed into a closing position by means of a helical spring. The flap is mounted rotatably on one side in a joint, so that it pivots on one side about the joint in order to pass from a closing position into an open position. The helical spring is, in this case, arranged inside the housing in such a way that it presses the flap into the closing position. To open the flap, it is necessary to press against the spring force of the helical spring. The disadvantage here is that a correspondingly high force has to be applied in order to compress the spring. The force to be applied has to be generated by means of flow forces which act on the flap, and, because of this disadvantage, the valve unit constitutes considerable flow resistance. As a result, the achievable air pressure within the intake region in the compressor housing falls. The compressor performance consequently falls.

SUMMARY OF THE INVENTION

In one contemplated embodiment, the present invention, therefore, provides a compressor assembly of the type initially mentioned, which avoids the abovementioned disadvantages and has a simple set-up, can be operated independently of the installation position and is distinguished by a low space requirement.

The present invention presents a compressor assembly with characterizing features enumerated herein. Other features are also described.

The invention includes the technical teaching that the closing element is of plate-shaped design. The closing element is guided freely and moves axially between the closing position and the open position via guide contours formed in the compressor housing.

This solution affords the advantage that the valve unit can be integrated within the compressor housing and therefore has a low (i.e., small) space requirement. In particular, the proposed valve unit is distinguished by an extremely small number of parts which makes it possible to have a simple version capable of being produced at low outlay (i.e., low manufacturing cost). In particular, the proposed valve unit can be operated in any installation position, since the closing element is guided via guide contours formed in the compressor housing, in order to change between a closing position and an open position. In this case, the dead weight of the closing element is unimportant, taking into account the direction of gravity, since the open position or the closing position is in each case assumed via a fluido-dynamic force action on the closing element. The plate-shaped design of the closing element may take the form of a circular closing cover which comes to lie as a cover in front of the air inlet port when the compressor is switched off and the closing position is assumed. When the closing element changes to the open position, a vacuum in the compressor housing is sufficient, the open position being maintained on account of the air flow which exerts force fluido-dynamically on the closing element.

An essential advantage of the present invention arises due to the guide contours which are formed in the compressor housing and which make unnecessary a joint, on which the closing element has to be mounted rotatably. The closing element is guided between the closing position and the open position, within the axially freely movable length, by means of the guide contours, guidance taking place via the plate margin of the closing element. The guide contours are formed within the intake port over a length which is sufficient to change between the closing position and the open position.

The guide contours for guiding the closing element are preferably produced as cast strips, the compressor housing comprising between two and six, preferably between three and five and, particularly preferably, four cast strips. The cast strips are produced in the form of milled webs which extend in the longitudinal direction of the intake port in the inner wall of the compressor housing. These are wavy in cross section, wave crests pointing radially inward and wave troughs pointing outward into the housing. In this case, particularly preferably, four cast strips are provided, which are distributed at a respective angle of 90° in relation to one another over the circular cross section of the intake port.

When the compressor is switched on, the closing element moves into the open position. The closing element is guided via the radially inward-directed wave crests of the cast strips, the air flow, which occurs due to the compressor intake, flowing through the wave troughs of the cast strips. The flow force acting on the closing element is sufficient to leave the latter in the open position. In this case, the installation position of the compressor and, therefore, that of the valve unit, are unimportant for the functioning of the valve, since the respective open or closing position is assumed and maintained solely via flow forces.

According to an advantageous embodiment of the invention, it is proposed that there be arranged at the intake port of the compressor housing a flange element having an air inlet port through which flows the air sucked in by the compressor assembly. The flange element in this case serves at the same time as a closure of the intake port, the latter being of radially symmetrical design and comprising a corresponding bore through which the air can be sucked in. The air inlet port in this case runs coaxially with the axis of symmetry of the flange element, so that the latter has rather a ring or tube shape, on which is formed on the outside a plate-shaped flange which is screwed onto a correspondingly machined plane face on the compressor housing.

The valve unit is arranged directly on the inside behind the flange element, the flange element having an inwardly directed sealing face, against which the closing element seals off in the closing position. This sealing face is designed as an annular face, the annular portion corresponding approximately to the outside diameter of the closing element. In the closing position, a sealing element is located between the sealing face of the flange element and the closing element, the sealing element sealing off the intake region of the compressor housing against the atmosphere in the closing position. A further sealing element is arranged between the flange element and the compressor housing, in order at this point, too, to ensure a corresponding leaktightness of the intake region (i.e., a leak-proof intake region). The seals may in each case be designed as O-ring seals, the sealing element which seals between the closing element and the flange element being received in the closing element. By contrast, the seal which seals between the flange element and the compressor housing is received in the flange element, but there is also the possibility that the sealing elements are in each case received on the other side. With a suitable choice of material, such as, for example, plastics, it would also be possible to achieve the desired sealing action via suitable geometric shapes.

Advantageously, the valve unit comprises a stroke limitation element, the axial movement of the closing element into the open position being limitable by means of the stroke limitation element. In this case, the stroke limitation element itself may be fixed axially at an appropriate point within the intake port, in order to adjust the placing of the open position and the closing element. In this case, the stroke limitation element may be at an appropriately adapted distance from the flange element, so that the closing element assumes an open position which affords minimal flow resistance for the sucked-in compressor air. The stroke limitation element is likewise of plate-shaped design, a cylindrical portion extending centrally in the direction of the flange element to which the valve plate is adjacent in the open position. Between the closing element and the stroke limitation element, a spring is in this case advantageously arranged which, in the switched-off state of the compressor assembly, presses the closing element against the sealing face of the flange element. In this case, the spring has low rigidity which exerts merely a low force on the closing element. The use of the spring serves, in particular, for the avoidance of rattling noises in the switched-off and relieved state, since the closing element is freely movable axially and, without the spring, would experience no force action, for example in order to remain in the closing position. The selected spring force is, in this case, so low that no appreciable force is required for the transition from the closing position to the open position, and therefore no or only minimal flow resistance arises on account of a narrowed flow cross section between the closing element and the flange element. The spring may, therefore, even be dispensed with from the valve unit. In terms of the placing of the closing element in the closing position, although the spring can have an assisting action, because of the rearward action of internal pressure in the intake port upon the flow it is possible for the closing element to close automatically and seal off against the sealing face of the flange element. The spring is in this case designed as a helical spring, and it may also be designed as a cup spring or the like which preferably acts as a compression spring.

In a further advantageous embodiment of the invention, the flange element has a hollow-cylindrical portion which is formed in the direction of the outside of the compressor housing. A filter receptacle can be pushed on the hollow-cylindrical portion on the outside and is fastened by means of a clamping element, such as a pipe clip, a tension element consisting of plastic or the like. In this case, the flange element is assigned the further function both of closing the intake port on the outside of the compressor housing, of offering a sealing face to the closing element on the inside and at the same time of providing the possibility for receiving a filter receptacle. The filter receptacle may be designed as an injection-molded component consisting of a plastic, which offers an outer contour which, furthermore, makes it possible to fasten a filter housing and/or an air filter. The filter housing in this case surrounds the air filter which is protected by this arrangement. The air sucked in through the intake port by the compressor assembly flows in this case through the corresponding ports in the filter housing through the filter and subsequently through the filter receptacle and enters the air inlet port in the flange element. When the compressor is switched off, then, the closing element closes against the flange element on the inside, so that the air inlet port, the filter receptacle and the filter and also the filter housing assume atmospheric pressure.

In an alternative embodiment of the valve unit of the compressor assembly, the valve unit is arranged in a separate housing, the separate housing being mountable on the compressor housing. This embodiment differs merely in the valve unit being arranged on the outside, but this does not lose the advantages of the solution according to the invention for forming the valve unit by means of an axially movable closing element.

BRIEF DESCRIPTION OF THE DRAWINGS

The invention is illustrated in more detail below together with the description of the preferred exemplary embodiment, with reference to the figures in which:

FIG. 2 shows a cross section of an intake region of a compressor assembly with a valve unit, the valve unit assuming an open position.

DETAILED DESCRIPTION OF EMBODIMENT(S) OF THE INVENTION

Figure 1:
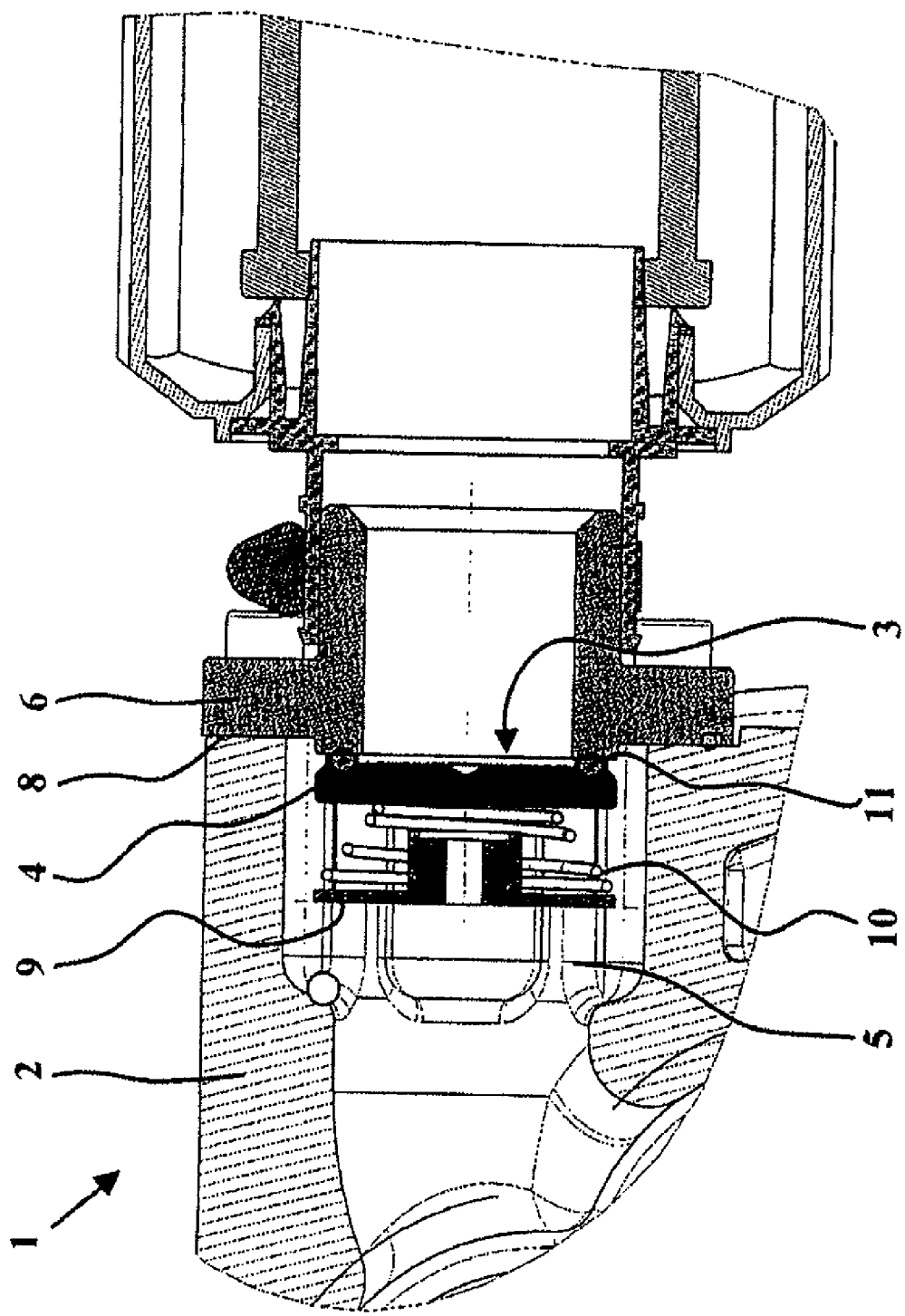
FIG. 1 shows a cross section of an intake region of a compressor assembly with a valve unit, the valve unit assuming a closing position.

The invention will now be described in connection with one or more embodiment(s). It is intended for the described embodiment(s) to be exemplary of the scope of the invention. As should be appreciated by those skilled in the art, there are numerous variations and equivalents of the embodiment(s) that also are intended to fall within the scope of the invention.

FIG. 1 illustrates a compressor assembly 1 in cross section, the region illustrated corresponding, in particular, to the intake port of the compressor assembly 1. During operation, the compressor sucks in through the intake port air which is subsequently compressed, in order to supply this subsequently to the respective consumers (i.e., components that use or consume the compressed air). The compressor assembly 1 comprises a compressor housing 2 which, on the transition to the outside, has the intake port which comprises a longitudinal portion. Within this longitudinal portion is arranged a valve unit 3 which, when the compressor assembly 1 is in operation, releases the inflow of the air to be compressed, whereas, in the switched-off state of the compressor assembly 1, the intake port is sealed off with respect to the outside by means of a closing position of the valve unit 3.

The valve unit 3 comprises a closing element 4, the latter being shown in a closing position in FIG. 1. The closing element 4 is of plate-shaped design and executes an axial movement within the intake port of the compressor housing 2.

For guiding the closing element 4, guide contours 5 are incorporated in the intake port within the longitudinal portion and center and axially guide the closing element 4 around the outer margin. In the closing position illustrated, the closing element 4 seals against a sealing face which is formed on a flange element 6. The closing element 4 receives a sealing element 11 which seals off between the sealing face in the flange element 6 and the closing element 4 itself. The flange element 6 is sealed off with respect to the housing 2 by means of a sealing element 8. The seals 8, 11 are in this case designed as O-ring seals.

The flange element 6 closes off the outer region of the intake port in the compressor housing 2, so that the valve unit 3 is located on the inside behind the flange element 6 and is therefore protected on the outside. The guide contours 5 in the intake region of the compressor housing 2 are designed as cast strips formed longitudinally. In this embodiment, it is anticipated that manufacture after the casting operation may include remachining by cutting. In this case, for example, a milling operation can provide a required dimensional accuracy for guidance, a required surface quality likewise being achievable. The cast strips have alternating wave crests and wave troughs, the closing element 4 being in contact with the wave crests. The length of the cast strips extends at least over the entire stroke movement of the closing element 4, so that the latter is guided over the entire range of movement. The open position of the closing element 4 is limited by a stroke limitation element 9 which, according to the present exemplary embodiment, has a flange-shaped design comprising a plate portion and a cylindrical portion, the cylindrical portion being formed in the direction of the closing element 4. The limitation element 9 is likewise accommodated within the cast strips in the intake port of the compressor housing 2 and limits the stroke of the closing element 4 in the open position. Between the closing element 4 and the stroke limitation element 9, a spring 10 is provided which prevents the closing element 4 from being freely movable in the closing position illustrated in FIG. 1, in order to avoid rattling. The spring 10 is designed as a helical spring and acts as a compression spring between the stroke limitation element 9 and the closing element 4.

FIG. 2 likewise illustrates the compressor assembly 1 in the region of the intake port, the valve unit 3 being shown in the open position. The sucked-in air then flows through the air inlet port 7 which extends as a cylindrical bore through the flange element 6 and subsequently through between the closing element 4 and the flange element 6. The guide contours 5 produced as cast strips then give the sucked-in compressor air the possibility of being able to flow past the closing element 4 in the region of the wave troughs. The wave troughs in this case form flow-around ducts, and according to the present exemplary embodiment, overall, four cast strips are incorporated over the circumference within the intake port in the intake region of the compressor housing. On account of the flow forces acting on the closing element 4, the latter opens in that it lifts off from the sealing face on the flange element 6. This gives rise to a flow gap between a sealing element 11, which is introduced in the closing element 4, and the sealing face of the flange element 6. The spring 10 is compressed in this position, the spring force being designed to be so low that no appreciable force has to be exerted on the closing element 4 in order to move the latter into the open position.

The flange element 6 has a hollow-cylindrical portion which extends in the direction of the outsides of the compressor housing 2. On the cylindrical portion is arranged a filter receptacle 12 which receives a filter housing 13 and an air filter 14. The sucked-in compressor air flows in through corresponding ports, not illustrated here, in the filter housing 13 and passes through the air filter 14. The compressor air subsequently enters the filter receptacle 12 and thereafter the air inlet port 7 in order to pass through the valve unit 3.

The invention is not restricted in its implementation to the preferred exemplary embodiment specified above. On the contrary, a number of variants may be envisaged which make use of the illustrated solution, even in versions which are fundamentally different. Thus, in particular, the invention is not restricted to use in connection with screw compressors.

The invention claimed is:

1. An air compressor assembly, comprising:
   a compressor housing;
   an intake port defined by the compressor housing for intake of the air;
   a plurality of guide contours, the plurality of guide contours being disposed adjacent to the intake port, the plurality of guide contours being formed as between three and six strips that are cast into the compressor housing;
   a valve unit disposed adjacent to the intake port, the valve unit comprising a closing element that assumes an opened position during operation and a closed position when in a switched-off state, wherein the closing element is plate-shaped, is axially movable, and is guided by the plurality of guide contours between the opened position and the closed position;
   a stroke limitation element configured to limit axial movement of the closing element in the opened position; and a spring disposed between the closing element and the stroke limitation element, the spring providing a return force to the closing element to bias the closing element into the closed position, wherein the stroke limitation element is plate-shaped and further comprises a cylindrical section configured to limit the axial movement of the closing element in the opened position.

2. The air compressor of claim 1, wherein the plurality of guide contours comprise between three and five cast strips.

3. The air compressor of claim 2, wherein the plurality of guide contours comprise four cast strips.

4. The air compressor of claim 1, wherein the spring is a helical spring.

5. The air compressor assembly of claim 1, wherein the valve unit is disposed in a separate housing, the separate housing being mounted on the compressor housing.

6. The air compressor assembly of claim 1, wherein the air compressor assembly is a screw compressor.

7. An air compressor assembly comprising:
a compressor housing;
an intake port defined by the compressor housing for intake of the air;
a plurality of guide contours, the plurality of guide contours being disposed adjacent to the intake port, the plurality of guide contours being formed as between three and six strips that are cast into the compressor housing;
a valve unit disposed adjacent to the intake port, the valve unit comprising a closing element that assumes an opened position during operation and a closed position when in a switched-off state, wherein the closing element is plate-shaped, is axially movable, and is guided by the plurality of guide contours between the opened position and the closed position;
a stroke limitation element to limit axial movement of the closing element in the opened position;
a spring disposed between the closing element and the stroke limitation element, the spring providing a return force to the closing element to bias the closing element into the closed position; and
a flange element positioned at the intake port, the flange element defining an air inlet port therethrough.

8. The air compressor assembly of claim 7, wherein the flange element is radially symmetrical and the air inlet port is coaxial with an axis of symmetry of the flange element.

9. The air compressor assembly of claim 7, wherein the flange element defines an inwardly directed sealing face, the closing element engaging the sealing face when in the closed position.

10. The air compressor of claim 7, further comprising:
a first sealing element disposed between the flange element and the compressor housing.

11. The air compressor of claim 9, wherein the closing element comprises a second sealing element that bears against the sealing face when the closing element is in the closed position.

12. The air compressor of claim 7, wherein the flange element comprises a hollow, cylindrical portion that extends exteriorly to the compressor housing.

13. The air compressor of claim 12, further comprising:
a filter receptacle connected to the hollow, cylindrical portion.

14. The air compressor of claim 13, wherein the filter receptacle receives at least one of a filter housing and an air filter therein.

15. The air compressor of claim 7, wherein the valve unit is positioned interiorly to the compressor housing, adjacent to the flange element.

* * * * *